United States Patent
Yamaki et al.

(10) Patent No.: US 10,669,641 B2
(45) Date of Patent: Jun. 2, 2020

(54) ION EXCHANGE MEMBRANE FOR ALKALI CHLORIDE ELECTROLYSIS, METHOD FOR ITS PRODUCTION AND ALKALI CHLORIDE ELECTROLYSIS APPARATUS

(71) Applicant: AGC Inc., Chiyoda-ku (JP)

(72) Inventors: Yasushi Yamaki, Chiyoda-ku (JP);
Takayuki Kaneko, Chiyoda-ku (JP);
Hiromitsu Kusano, Chiyoda-ku (JP);
Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 72 days.

(21) Appl. No.: 16/156,320

(22) Filed: Oct. 10, 2018

(65) Prior Publication Data

US 2019/0040537 A1 Feb. 7, 2019

Related U.S. Application Data

(63) Continuation of application No. PCT/JP2017/015158, filed on Apr. 13, 2017.

(30) Foreign Application Priority Data

Apr. 13, 2016 (JP) .................................. 2016-080157

(51) Int. Cl.
| | |
|---|---|
| *C25B 13/08* | (2006.01) |
| *B01J 39/20* | (2006.01) |
| *B01J 47/12* | (2017.01) |
| *C25B 1/46* | (2006.01) |
| *B01J 39/05* | (2017.01) |
| *B01J 39/07* | (2017.01) |
| *C25B 9/10* | (2006.01) |

(52) U.S. Cl.
CPC ............... *C25B 13/08* (2013.01); *B01J 39/05* (2017.01); *B01J 39/07* (2017.01); *B01J 39/20* (2013.01); *B01J 47/12* (2013.01); *C25B 1/46* (2013.01); *C25B 9/10* (2013.01)

(58) Field of Classification Search
CPC ... C25B 13/08; C25B 1/46; C25B 9/10; B01J 39/20; B01J 39/05; B01J 39/07; B01J 47/12
USPC ......................................................... 521/27
See application file for complete search history.

(56) References Cited

U.S. PATENT DOCUMENTS

| | | | | |
|---|---|---|---|---|
| 4,729,819 | A | 3/1988 | Suhara et al. | |
| 9,435,044 | B2 * | 9/2016 | Yamaki | ................... B01J 47/12 |
| 2009/0306233 | A1 * | 12/2009 | Umemura | .............. C08J 5/2237 |
| | | | | 521/27 |
| 2014/0360868 | A1 * | 12/2014 | Yamaki | ................... B01J 47/12 |
| | | | | 204/296 |

FOREIGN PATENT DOCUMENTS

| | | |
|---|---|---|
| CN | 104114749 A | 10/2014 |
| EP | 2 110 464 A1 | 10/2009 |
| JP | 54-11098 | 1/1979 |
| JP | 61-166991 | 7/1986 |
| JP | 6-33281 | 2/1994 |
| JP | 06033281 A * | 2/1994 |
| JP | 2014-58707 | 4/2014 |
| JP | 2014058707 A * | 4/2014 |
| WO | WO 2016/027862 A1 | 2/2016 |
| WO | WO-2016027862 A1 * | 2/2016 ............. B01J 47/12 |
| WO | WO 2016/072506 A1 | 5/2016 |
| WO | WO 2017/043590 A1 | 3/2017 |
| WO | WO 2017/043591 A1 | 3/2017 |
| WO | WO 2017/043592 A1 | 3/2017 |

OTHER PUBLICATIONS

International Search Report dated Jun. 13, 2017 in PCT/JP2017/015158, filed on Apr. 13, 2017 (with English Translation).

* cited by examiner

*Primary Examiner* — Michael Bernshteyn
(74) *Attorney, Agent, or Firm* — Oblon, McClelland, Maier & Neustadt, L.L.P.

(57) ABSTRACT

To provide an ion exchange membrane for alkali chloride electrolysis whereby it is possible to make the electrolysis voltage low and the current efficiency high at the time of performing electrolysis of an alkali chloride; a method for its production; and an alkali chloride electrolysis apparatus using it. The ion exchange membrane for alkali chloride electrolysis has a layer (C) comprising a fluorinated polymer having carbonic acid functional groups, and a layer (S) comprising a fluorinated polymer having sulfonic acid functional groups; a reinforcing material containing reinforcing threads is disposed in the layer (S); and when measured after the ion exchange membrane for alkali chloride electrolysis is immersed and held in a 32 mass % sodium hydroxide aqueous solution warmed at 90° C. for 16 hours and subsequently immersed in a 32 mass % sodium hydroxide aqueous solution at 25° C. for 3 hours, the AC resistance value A of the layer (S) and the AC resistance value B of the layer (C) satisfy the following formulae at the same time: $1(\Omega \cdot cm^2) \leq A \leq 10(\Omega \cdot cm^2)$ and $200(\Omega \cdot cm^2) \leq B \leq 450(\Omega \cdot cm^2)$.

12 Claims, 1 Drawing Sheet

ION EXCHANGE MEMBRANE FOR ALKALI CHLORIDE ELECTROLYSIS, METHOD FOR ITS PRODUCTION AND ALKALI CHLORIDE ELECTROLYSIS APPARATUS

TECHNICAL FIELD

The present invention relates to an ion exchange membrane for alkali chloride electrolysis, a method for its production, and an alkali chloride electrolysis apparatus.

BACKGROUND ART

As an ion exchange membrane to be used in an alkali chloride electrolysis method for producing an alkali hydroxide and chlorine by electrolyzing an aqueous alkali chloride solution such as saline, an electrolyte membrane made of a fluorinated polymer having ion exchange groups (such as carboxylic acid groups or carboxylate groups, sulfonic acid groups or sulfonate groups) is known.

As such an ion exchange membrane, for example, Patent Document 1 discloses an ion exchange membrane for alkali chloride electrolysis which comprises a layer (C) comprising a fluorinated polymer having carboxylic acid functional groups, a layer (S) comprising a fluorinated polymer having sulfonic acid functional groups, and a reinforcing material, wherein the respective ion exchange capacities of a layer (Sa) and a layer (Sb) contained in the layer (S) are in a predetermined relationship (Claim 1, etc.).

PRIOR ART DOCUMENTS

Patent Documents

Patent Document 1: WO2016/072506

DISCLOSURE OF INVENTION

Technical Problem

The above ion exchange membrane is used in an alkali chloride electrolysis apparatus having an electrolytic bath provided with a cathode and an anode. In recent years, at the time of the operation of such an alkali chloride electrolysis apparatus, further improvement in the production efficiency is desired.

Here, as an index representing the production efficiency, the electric power consumption rate is known, and the smaller the electric power consumption rate, the better the production efficiency. The electric power consumption rate is calculated from a value obtained by dividing the power consumption by e.g. the production volume. Therefore, if it is possible to reduce the power consumption per production volume, the electric power consumption rate will be reduced, whereby the production efficiency can be said to be improved. Further, the electric power consumption rate is correlated with a value obtained by dividing the electrolysis voltage by the current efficiency, and thus, if it is possible to lower the electrolysis voltage and increase the current efficiency during electrolysis of an alkali chloride, it will be possible to improve the production efficiency.

From such a point of view, the present inventors have conducted a study on the alkali chloride electrolysis apparatus having the ion exchange membrane described in Patent Document 1, and as a result, it has been found that there is room for improvement with respect to at least one of the electrolysis voltage and the current efficiency at the time of electrolysis of an alkali chloride.

In view of the above circumstances, it is an object of the present invention to provide an ion exchange membrane for alkali chloride electrolysis whereby at the time of electrolysis of an alkali chloride, it is possible to lower the electrolysis voltage and to improve the current efficiency, a method for its production, and an alkali chloride electrolysis apparatus using it.

Solution to Problem

The present inventors have intensively studied the above problems, and as a result, they have found that in an ion exchange membrane for alkali chloride electrolysis having a layer (S) comprising a fluorinated polymer having sulfonic acid functional groups, and a layer (C) comprising a fluorinated polymer having carboxylic acid functional groups, when the AC resistance value A of the layer (S) and the AC resistance value B of the layer (C) under predetermined conditions are within predetermined ranges, it is possible to obtain the desired effects, and thus have arrived at the present invention.

That is, the present inventors have found that it is possible to solve the above problems by the following constructions.

[1] An ion exchange membrane for alkali chloride electrolysis, having a layer (C) comprising a fluorinated polymer having carboxylic acid functional groups, and a layer (S) comprising a fluorinated polymer having sulfonic acid functional groups, characterized in that a reinforcing material comprising reinforcing threads is disposed in the layer (S), and when measured after the ion exchange membrane for alkali chloride electrolysis is immersed and held in a 32 mass % sodium hydroxide aqueous solution warmed at 90° C. for 16 hours and subsequently immersed in a 32 mass % sodium hydroxide aqueous solution at 25° C. for 3 hours, the AC resistance value A of said layer (S) and the AC resistance value B of said layer (C) satisfy the following formulae at the same time, $$1(\Omega \cdot cm^2) \leq A \leq 10(\Omega \cdot cm^2)$$

$$170(\Omega \cdot cm^2) \leq B \leq 550(\Omega \cdot cm^2)$$

[2] The ion exchange membrane for alkali chloride electrolysis according to [1], wherein the ratio (A/B) of the AC resistance value A to the AC resistance value B satisfies the following formula, $$A/B \leq 0.03$$

[3] The ion exchange membrane for alkali chloride electrolysis according to [1] or [2], wherein the thickness when dried of the layer (C) is from 1 to 50 µm, and the thickness when dried of the layer (S) is from 30 to 200 µm.

[4] The ion exchange membrane for alkali chloride electrolysis according to any one of [1] to [3], wherein at least a part of the fluorinated polymer having sulfonic acid functional groups constituting the layer (S) is a polymer having structural units represented by the following formula (U1), wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, when $X^1$ is an oxygen atom, a is 0, when $X^1$ is a nitrogen atom, a is 1, when $X^1$ is a carbon atom, a is 2, $Y^1$ is a fluorine atom or a monovalent perfluoro organic group, r is 0 or 1, and M is a hydrogen atom, an alkali metal or a quaternary ammonium base.

[5] The ion exchange membrane for alkali chloride electrolysis according to [4], wherein the structural units represented by the formula (U1) are structural units based on a monomer represented by the formula (m1), (m1)

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

[6] The ion exchange membrane for alkali chloride electrolysis according to any one of [1] to [5], which further has an inorganic particle layer comprising inorganic particles and a binder, on at least one of the outermost surfaces.

[7] A method for producing the ion exchange membrane for alkali chloride electrolysis as defined in any one of [1] to [6], characterized by comprising a step of obtaining a reinforced precursor membrane having a precursor layer (C') comprising a fluorinated polymer having groups convertible to carboxylic acid functional groups, a precursor layer (S') comprising a fluorinated polymer having groups convertible to sulfonic acid functional groups, and a reinforcing material comprising reinforcing threads, disposed in the precursor layer (S'), and a step of obtaining said ion exchange membrane for alkali chloride electrolysis by contacting the reinforced precursor membrane and an aqueous alkaline solution to convert the groups convertible to carboxylic acid functional groups in the precursor layer (C') to the carboxylic acid functional groups thereby to form said layer (C), and to convert the groups convertible to sulfonic acid functional groups in the precursor layer (S') to the sulfonic acid functional groups thereby to form said layer (S).

[8] The method for producing the ion exchange membrane for alkali chloride electrolysis according to [7], wherein in the step of obtaining said ion exchange membrane for alkali chloride electrolysis, as the aqueous alkaline solution, a first aqueous alkaline solution and a second aqueous alkaline solution different from the first aqueous alkaline solution in at least one of the composition and the temperature, are prepared, and the precursor layer (C') is brought in contact with the first aqueous alkaline solution, and the precursor layer (S') is brought in contact with the second aqueous alkaline solution.

[9] The method for producing the ion exchange membrane for alkali chloride electrolysis according to [7] or [8], wherein the first aqueous alkaline solution comprises an alkali metal hydroxide, a water-soluble organic solvent and water, and in the above first aqueous alkaline solution (100 mass %), the concentration of the alkali metal hydroxide is from 1 to 60 mass %, and the concentration of the water-soluble organic solvent is from 1 to 60 mass %; and the second aqueous alkaline solution comprises an alkali metal hydroxide, a water-soluble organic solvent and water, and in the above second aqueous alkaline solution (100 mass %), the concentration of the alkali metal hydroxide is from 1 to 60 mass %, and the concentration of the water-soluble organic solvent is from 1 to 60 mass %.

[10] The method for producing the ion exchange membrane for alkali chloride electrolysis according to any one of [7] to [9], wherein the temperature of the first aqueous alkaline solution is from 30 to 95° C., and the temperature of the second aqueous alkaline solution is from 30 to 95° C.

[11] The method for producing the ion exchange membrane for alkali chloride electrolysis according to any one of [7] to [10], wherein the alkali metal hydroxide is sodium hydroxide or potassium hydroxide.

[12] The method for producing the ion exchange membrane for alkali chloride electrolysis according to any one of [7] to [11], wherein the water-soluble organic solvent contains at least one member selected from the group consisting of aprotic organic solvents, alcohols and amino alcohols.

[13] An alkali chloride electrolysis apparatus comprising an electrolyte bath provided with a cathode and an anode, and the ion exchange membrane for alkali chloride electrolysis as defined in any one of [1] to [6], wherein the ion exchange membrane for alkali chloride electrolysis is disposed in the electrolyte bath so as to partition the cathode and the anode, the layer (C) of the ion exchange membrane for alkali chloride electrolysis is disposed on the cathode side, and the layer (S) of the ion exchange membrane for alkali chloride electrolysis is disposed on the anode side.

Advantageous Effects of Invention

According to the present invention, it is possible to provide an ion exchange membrane for alkali chloride electrolysis, whereby it is possible to lower the electrolysis voltage and improve the current efficiency at the time of electrolysis of an alkali chloride, a method for its production, and an alkali chloride electrolysis apparatus using it.

DESCRIPTION OF EMBODIMENTS

The following definitions of terms apply throughout the specification including claims, unless otherwise stated.

An "ion exchange group" is such a group that at least some of ions contained in the group can be exchanged with other ions, and the following carboxylic acid functional group, sulfonic acid functional group, etc. may be mentioned.

A "carboxylic acid functional group" means a carboxylic acid group (—COOH) or a carboxylate group (—COOM¹ where $M^1$ is an alkali metal or a quaternary ammonium base).

A "sulfonic acid functional group" means a sulfonic acid group (—SO₃H) or a sulfonate group (—SO₃M², where M² is an alkali metal or a quaternary ammonium base).

A "precursor layer" is a layer (membrane) comprising a polymer having groups convertible to ion exchange groups.

The "groups convertible to ion exchange groups" mean groups convertible to ion exchange groups by treatment such as hydrolysis treatment or acid form conversion treatment.

The "groups convertible to carboxylic acid functional groups" mean groups convertible to carboxylic acid functional groups by treatment such as hydrolysis treatment or acid form conversion treatment.

The "groups convertible to sulfonic acid functional groups" mean groups convertible to sulfonic acid functional groups by treatment such as hydrolysis treatment or acid form conversion treatment.

As the unit for an ion exchange capacity, "meq/g dry resin" may be represented in simplified form by "meq/g".

A "perfluorocarbon polymer" means such a polymer that all of hydrogen atoms bonded to carbon atoms in the polymer are substituted by fluorine atoms. Some of fluorine atoms in the perfluorocarbon polymer may optionally be substituted with one or both of chlorine atoms and bromine atoms.

A "perfluoromonomer" means such a monomer that all of hydrogen atoms bonded to carbon atoms in the monomer are substituted by fluorine atoms.

A "structural unit" means a polymerized unit derived from a monomer, present in the polymer and constituting the polymer. For example, in a case where a structural unit is formed by addition polymerization of a monomer having a carbon-carbon unsaturated double bond, the structural unit derived from such a monomer is a divalent structural unit formed by cleavage of the unsaturated double bond. Otherwise, a structural unit may be a structural unit obtained by, after forming a polymer having a structure of a certain structural unit, converting the structural unit chemically, for example, by hydrolysis. Further, in some cases, a structural unit derived from an individual monomer may be represented by a name having "unit" attached to the monomer's name.

A "reinforcing material" means a material to be used to improve the strength of an ion exchange membrane. The reinforcing material is a material derived from a reinforcing fabric.

A "reinforcing fabric" means a fabric which is used as a raw material of a reinforcing material to improve the strength of an ion exchange membrane.

"Reinforcing threads" are threads which constitute a reinforcing fabric and which are made of a material that will not be eluted even when the reinforcing fabric is immersed in an aqueous alkaline solution (e.g. an aqueous sodium hydroxide solution with a concentration of 32 mass %).

"Sacrificial threads" are threads which constitute a reinforcing fabric and which are made of a material that will be eluted in an aqueous alkaline solution, when the reinforcing fabric is immersed in the aqueous alkaline solution.

"Elution holes" mean holes formed as a result of elution of sacrificial threads in an aqueous alkaline solution.

A "reinforced precursor membrane" means a membrane having a reinforcing fabric disposed in a precursor layer.

A numerical range expressed by using "to" means a range including numerical values described before and after "to" as the lower limit value and the upper limit value.

[Ion Exchange Membrane]

The ion exchange membrane for alkali chloride electrolysis of the present invention (hereinafter referred to also as the ion exchange membrane) has a layer (C) comprising a fluorinated polymer having carboxylic acid functional groups (hereinafter, referred to also as a fluorinated polymer (C)) and a layer (S) comprising a fluorinated polymer having sulfonic acid functional groups (hereinafter referred to also as a fluorinated polymer (S)); in the layer (S), a reinforcing material comprising reinforcing threads, is disposed; and when measured after the above ion exchange membrane for alkali chloride electrolysis is immersed and held in a 32 mass % sodium hydroxide aqueous solution warmed at 90° C. for 16 hours, and subsequently in a 32 mass % sodium hydroxide aqueous solution at 25° C. for 3 hours, the AC resistance value A of said layer (S) and the AC resistance value B of said layer (C) satisfy the following formulae at the same time:

$$1(\Omega \cdot cm^2) \leq A \leq 10(\Omega \cdot cm^2)$$

$$170(\Omega \cdot cm^2) \leq B \leq 550(\Omega \cdot cm^2)$$

Here, in an alkali chloride electrolysis apparatus, the properties required are different depending upon the position where the ion exchange membrane is disposed. Therefore, on the anode side, the layer comprising a fluorinated polymer having sulfonic acid functional groups with a high ion exchange capacity is disposed, and on the cathode side, the layer comprising a fluorinated polymer having carboxylic acid functional groups with a low ion exchange capacity is disposed.

However, the present inventors know that, as shown also in Examples given hereinafter, only by setting the ion exchange capacity of each layer to a predetermined value, there may be a case where it is not possible to achieve a low electrolysis voltage and high current efficiency.

Therefore, the present inventors have conducted an extensive study on the physical properties of each layer and, as a result, have found that AC resistance values constituting an ion exchange membrane are closely related to the achievement of a low electrolytic voltage and high current efficiency. That is, the present inventors have found that such AC resistance values vary depending upon a plurality of elements including not only the above-mentioned ion exchange capacity of each layer constituting the ion exchange membrane, but also the thickness of each layer, the water content of each layer, the composition of an aqueous alkaline solution to be used in the production of the ion exchange membrane, and the treatment temperature with the aqueous alkaline solution, and have arrived at setting the AC resistance value A of the layer (S) and the AC resistance value B of the layer (C), whereby it is possible to provide the effects of the present invention by adjusting the plurality of such elements.

Hereinafter, the ion exchange membrane for alkali chloride electrolysis of the present invention will be described with reference to FIGS. 1 and 2, but the present invention is not limited to the contents of FIGS. 1 and 2.

The ion exchange membrane for alkali chloride electrolysis 1 shown in FIG. 1 (hereinafter referred to as ion exchange membrane 1) is one having an electrolyte membrane 10 made of a fluorinated polymer having ion exchange groups reinforced by a reinforcing material 20.

[Electrolyte Membrane]

The electrolyte membrane 10 is a laminate comprising a layer (C) 12 and a layer (S) 14. A reinforcing material 20 comprising reinforcing threads is disposed in the layer (S) 14.

<Layer (C)>

The layer (C) 12 may be any layer comprising a fluorinated polymer (C), but from the viewpoint of electrolytic performance, preferred is a layer composed solely of a fluorinated polymer (C) which contains no material other than the fluorinated polymer (C). That is, the layer (C) 12 is preferably a layer made of a fluorinated polymer having carboxylic acid functional groups.

Figure 1:
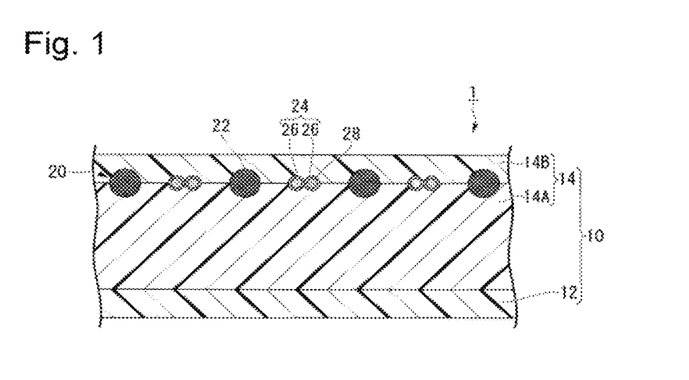
FIG. 1 is a schematic cross-sectional view of an example of the ion exchange membrane for alkali chloride electrolysis of the present invention.

In FIG. 1, the layer 12 is shown as a single layer, but it may be a layer formed of a plurality of layers. When the layer 12 is formed of a plurality of layers, the construction may be such that in the respective layers, the types of structural units constituting the fluorinated polymer (C) or the proportions of structural units having carboxylic acid functional groups may be different.

The thickness of the layer 12 when dried (in a case where the layer 12 is formed of a plurality of layers, their total) is preferably from 1 to 50 μm, more preferably from 5 to 50 μm, further preferably from 8 to 35 μm, particularly preferably from 9 to 22 μm.

The thickness of the layer 12 is, together with the ion exchange capacity, largely influential to the caustic quality of an aqueous alkali hydroxide solution obtainable by electrolysis. Thus, if the thickness is thin, chloride ions tend to easily be transmitted through the ion exchange membrane, so that the chlorine concentration in the obtainable aqueous alkali hydroxide solution will be increased. That is, in order to maintain a high caustic quality, it is important that the thickness is at least the above lower limit value.

On the other hand, the layer 12 presents a large influence also to the electrolysis voltage, and if its thickness is thick, the electrolysis voltage tends to rise significantly. That is, it is important that the thickness is at most the above upper limit value, so that it is possible to suppress the electric resistance of the ion exchange membrane 1 to be low, and in order to suppress an increase in the electrolysis voltage.

Further, the thickness of the layer 12 is highly related to the AC resistance value B, and the thicker the thickness, the higher the AC resistance value B tends to be, and the thinner the thickness, the lower the AC resistance value B tends to be. Thus, when its thickness is within the above range, it will be easy to control the AC resistance value B within a predetermined range.

The ion exchange capacity of the fluorinated polymer (C) constituting the layer 12 is preferably from 0.5 to 2.0 meq/g, more preferably from 0.8 to 2.0 meq/g, further preferably from 0.85 to 1.10 meq/g, most preferably from 0.95 to 1.10 meq/g.

Further, in a case where the layer 12 is formed of a plurality of layers, it is preferred that the ion exchange capacities of all fluorinated polymers (C) constituting it are in the above range.

When the ion exchange capacity of the fluorinated polymer (C) is at least the above lower limit value, the electrical resistance of the ion exchange membrane during the electrolysis of an alkali chloride aqueous solution tends to be low, and it is possible to obtain an ion exchange membrane whereby the electrolysis voltage is low. When the ion exchange capacity is at most the above upper limit value, it is easy to synthesize a polymer with a high molecular weight, and it is possible to prevent excessive swelling of the polymer and to obtain an ion exchange membrane whereby the current efficiency tends to be hardly lowered. Further, its ion exchange capacity is highly related to the AC resistance value B, and when the ion exchange capacity is made to be at most the above upper limit value, it becomes easy to control the AC resistance value B to be within a predetermined range.

The fluorinated polymer (C) is preferably obtained by converting the groups convertible to carboxylic acid functional groups of the fluorinated polymer as described later to the carboxylic acid functional groups in the step of obtaining an ion exchange membrane for alkali chloride electrolysis as will be described later.

As the fluorinated polymer (C), for example, a fluorinated polymer may be mentioned which is obtained by subjecting a copolymer (hereinafter referred to also as a fluorinated polymer (C')) of a monomer (hereinafter referred to also as a fluorinated monomer (C')) having a group convertible to a carboxylic acid functional group and fluorine atom(s), and a fluorinated olefin, to hydrolysis treatment, to convert groups convertible to carboxylic acid functional groups, to the carboxylic acid functional groups.

The fluorinated monomer (C') is not particularly limited so long as it is a compound having at least one fluorine atom in the molecule, having an ethylenic double bond, and having a group convertible to a carboxylic acid functional group, and it is possible to employ a known compound.

As the fluorinated monomer (C'), from the viewpoint of the production cost, the reactivity with other monomers, and excellent properties of the obtainable fluorinated polymer, preferred is a monomer represented by the formula (1).

The symbols in the formula (1) have the following meanings.

X and X' are each independently a fluorine atom or a trifluoromethyl group.

$A^1$ is a group convertible to a carboxylic acid functional group. Specifically, —CN, —COF, —COOR$^1$ (R$^1$ is a $C_{1-10}$ alkyl group) or —COONR$^2$R$^3$ (R$^2$ and R$^3$ are each independently a hydrogen atom or a $C_{1-10}$ alkyl group) may be mentioned.

p is 0 or 1. q is from 0 to 12. r is from 0 to 3. s is 0 or 1. t is from 0 to 12. u is from 0 to 3. However, 1≤p+s, and 1≤r+u.

Specific examples of the monomer represented by the formula (1) include the following ones, and from such a viewpoint that production is easy, preferred are compounds wherein p=1, q=0, r=1, s=0 to 1, t=0 to 3, and u=0 to 1.

As the fluorinated monomer (C'), one type may be used alone, or two or more types may be used in combination.

The fluorinated olefin may, for example, be a $C_{2\text{ or }3}$ fluoroolefin having one or more fluorine atoms in the molecule. Specific examples include tetrafluoroethylene ($CF_2$=$CF_2$) (hereinafter referred to as TFE), chlorotrifluoroethylene ($CF_2$=CFCl), vinylidene fluoride ($CF_2$=$CH_2$), vinyl fluoride ($CH_2$=CHF), hexafluoropropylene ($CF_2$=$CFCF_3$), etc. Among them, from the viewpoint of the production cost, the reactivity with other monomers and excellent properties of the obtainable fluorinated polymer, TFE is particularly preferred. As the fluorinated olefin, one type may be used alone, or two or more types may be used in combination.

In the production of the fluorinated polymer (C'), in addition of the monomer (C') and a fluorinated olefin, other monomers may further be used. Other monomers may be $CF_2=CFR^f$ (where $R^f$ is a $C_{2-10}$ perfluoroalkyl group), $CF_2=CF-OR^{f1}$ (where $R^{f1}$ is a $C_{1-10}$ perfluoroalkyl group), $CF_2=CFO(CF_2)_vCF=CF_2$ (where v is an integer of from 1 to 3), etc. By copolymerizing other monomers, it is possible to increase the flexibility or mechanical strength of the ion exchange membrane.

The ion exchange capacity of the fluorinated polymer (C) can be adjusted by changing the content of structural units derived from a fluorinated monomer (C') in the fluorinated polymer (C')). The content of carboxylic acid functional groups in the fluorinated polymer (C) is preferably the same as the content of groups convertible to carboxylic acid functional groups in the fluorinated polymer (C').

The range of TQ value of the fluorinated polymer (C) is, from the viewpoint of the mechanical strength and membrane-forming properties as an ion exchange membrane, preferably from 150 to 350° C., more preferably from 170 to 300° C., further preferably from 200 to 250° C. TQ value is a value related to the molecular weight of the polymer, and its measurement method will be described later, but the higher the TQ value, the higher the molecular weight.

<Layer (S)>

The layer (S) 14 may be any layer comprising a fluorinated polymer (S), but from the viewpoint of the electrolytic performance, preferred is a layer composed solely of a fluorinated polymer (S) containing no material other than the fluorinated polymer (S). That is, the layer 14 is preferably a layer made of a fluorinated polymer having sulfonic acid functional groups.

As shown in FIG. 1, in the layer 14, a reinforcing material 20 (as described later) is disposed to increase the mechanical strength of the ion exchange membrane 1. In the layer 14, a layer positioned on the layer 12 side of the reinforcing material 20 (the cathode side in the electrolysis apparatus) (i.e. a layer containing a surface in contact with the layer 12) is a layer (Sa) 14A, and a layer positioned on the side opposite to the layer 12 side of the reinforcing material 20 (the anode side in the electrolysis apparatus) (i.e. a layer containing a surface opposite to the surface in contact with the layer 12) is a layer (Sb) 14B.

In FIG. 1, each of the layer 14A and the layer 14B is shown as a single layer, but each may be a layer formed of a plurality of layers. In a case where one or both of the layer 14A and the layer 14B are formed of a plurality of layers, the construction may be such that in the respective layers, the types of structural units constituting the fluorinated polymer (S) or the proportions of the structural units having sulfonic acid functional groups may be different.

The thickness of the layer (S) 14 when dried (in a case where the layer 14 is formed of a plurality of layers, their total) is preferably from 30 to 200 μm, more preferably from 55 to 200 μm, further preferably from 70 to 120 μm. When the thickness is at least the above lower limit value, the mechanical strength of the ion exchange membrane 1 will be sufficiently high. When the thickness is at most the above upper limit value, it is possible to reduce the electric resistance of the ion exchange membrane 1.

Further, the thickness of the layer 14 has a high relationship with the AC resistance value A, and the thicker the thickness, the higher the AC resistance value A becomes, and the thinner the thickness, the lower the AC resistance value A becomes. Therefore, when the thickness of the layer 14 is in the above range, it will be easy to control the AC resistance value A to be within a predetermined range.

The thickness of the layer (Sa) 14A when dried (in a case where the layer 14A is formed of a plurality of layers, their total) is preferably from 30 to 140 μm, more preferably from 40 to 140 μm, further preferably from 40 to 90 μm. When the thickness is at least the above lower limit value, the mechanical strength of the ion exchange membrane 1 will be sufficiently high. When the thickness is at most the above upper limit value, it is possible to lower the electric resistance of the ion exchange membrane 1.

In order to satisfy both the electrolysis voltage and the mechanical strength, it is very important that the thickness of the layer 14A is within the above range.

The thickness of the layer 14A has a high relationship with the AC resistance value A, and the thicker the thickness, the higher the AC resistance value A becomes, and the thinner the thickness of the layer (Sa) 14A when dried, the lower the AC resistance value A becomes. Thus, when the thickness is within the above range, it becomes easy to control the AC resistance value A to be within a predetermined range.

The ion exchange capacity of the fluorinated polymer (S) constituting the layer (Sa) 14A is preferably from 0.6 to 2.5 meq/g, more preferably from 0.9 to 1.2 meq/g. In a case where the layer 14A is formed of a plurality of layers, it is preferred that the ion exchange capacities of all fluorinated polymers constituting it, are in the above range. Further, the layer 14A is preferably made of a plurality of layers, and more preferably made of two layers. In another embodiment, it is preferred that the layer 14A is a single layer.

When the ion exchange capacity of the fluorinated polymer (S) constituting the layer 14A (S) is at least the above lower limit value, the electrical resistance of the ion exchange membrane will be low, and the electrolysis voltage during electrolysis of an aqueous alkali chloride solution can be lowered. Further, when the ion exchange capacity of the fluorinated polymer (S) is at most the upper limit value, it will be easy to further increase the molecular weight of the fluorinated polymer (S) during the polymerization, and by using a fluorinated polymer (S) having a higher molecular weight for the layer (Sa), it is possible to make the strength of the layer (Sa) higher.

The thickness of the layer (Sb) 14B when dried (in a case where the layer 4B is formed of a plurality of layers, their total) is preferably from 5 to 100 μm, more preferably from 10 to 50 μm, further preferably from 10 to 40 μm. If the thickness is too thin, the reinforcing material present immediately below the layer (Sb) 14B will be located very close to the surface of the ion exchange membrane, whereby the influence to the peeling resistance or the mechanical strength tends to be large. Therefore, by adjusting the thickness to be at least the above lower limit value, the reinforcing material 20 will be disposed at a proper position in depth from the surface of the electrolyte membrane 10, and the peeling resistance of the reinforcing material 20 will be improved. Further, cracking will be less likely to occur at the surface of the electrolyte membrane 10, and, as a result, a decrease in mechanical strength can be prevented. If the thickness of the ion exchange membrane 1 is thick, the electrical resistance becomes high, and therefore, when the thickness of the layer 14B is at most the above upper limit value, it is possible to control the electric resistance of the ion exchange membrane 1 to be low and to prevent an increase of the electrolysis voltage.

Further, the thickness of the layer 14B when dried, has a high relationship with the AC resistance value A, and the thicker the thickness, the higher the AC resistance value A becomes, and the thinner the thickness, the lower the AC resistance value A becomes. Therefore, when the thickness of the layer 14B is within the above range, it becomes easy to control the AC resistance value A to be within a predetermined range.

The ion exchange capacity of the fluorinated polymer (S) constituting the layer (Sb) 14B is preferably from 0.5 to 2.5 meq/g, more preferably from 0.6 to 2.5 meq/g, further preferably from 0.9 to 2.0 meq/g, particularly preferably from 1.05 to 2.00 meq/g.

In a case where the layer 14B is formed of a plurality of layers, it is preferred that the ion exchange capacity of at least a fluorinated polymer (S) constituting the layer positioned on the most anode side is in the above range, and it is more preferred that the ion exchange capacities of all fluoropolymers (S) constituting the layer 14B are in the above range. Further, in another embodiment, it is preferred that the layer 14B is made of a single layer, and the ion exchange capacity of the fluorinated polymer (S) constituting this layer is in the above range.

When the ion exchange capacity of the fluorinated polymer (S) constituting the layer 14B is at least the above lower limit value, the electrical resistance of the ion exchange membrane will be low, and the electrolysis voltage at the time of electrolysis can be made low. On the other hand, when the ion exchange capacity is at most the above upper limit value, it is possible to maintain the membrane strength by using a fluorinated polymer (S) with a high molecular weight and with high mechanical strength, and to prevent the membrane breakage during the electrolysis operation or at the time of mounting the membrane.

Further, the ion exchange capacity of the fluorinated polymer (S) has a high relationship with the AC resistance value, and when the ion exchange capacity of the fluorinated polymer (S) constituting the layer 14B is made to be at most the above upper limit value, it becomes easy to control the AC resistance value A to be within a predetermined range.

At least a part of the fluorinated polymer having sulfonic acid functional groups constituting the layer 14B is preferably a polymer having structural units based on a monomer having at least two, preferably two, sulfonic acid functional groups. By doing so, it is possible to increase the ion exchange group concentration per unit weight at the same monomer concentration, and therefore, as compared to a polymer having structural units each having only one sulfonic acid functional group, even in a small monomer amount, it is possible to form a layer (Sb) having a higher ion exchange capacity.

As a structural unit based on a monomer having at least two sulfonic acid functional groups, preferred is one represented by the following formula (U1).

In the formula (U1), $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, when $X^1$ is an oxygen atom, a is 0, when $X^1$ is a nitrogen atom, a is 1, when $X^1$ is a carbon atom, a is 2, $Y^1$ is a fluorine atom or a monovalent perfluoro organic group, r is 0 or 1, and M is a hydrogen atom, an alkali metal or a quaternary ammonium base. $X^1$ is preferably is an oxygen atom, and $Y^1$ is preferably is a fluorine atom.

The fluorinated polymer (S) is preferably obtained by converting groups convertible to sulfonic acid functional groups of a fluorinated polymer having groups convertible to sulfonic acid functional groups, to the sulfonic acid functional groups in a step of obtaining an ion exchange membrane for alkali chloride electrolysis which will be described later.

The fluorinated polymer (S) may, for example, be a fluorinated polymer obtained by subjecting a copolymer (hereinafter referred to also as a fluorinated polymer (S')) of a monomer (hereinafter referred to also as a fluorinated monomer (S')) having a group convertible to a sulfonic acid functional group and fluorine atom(s), and a fluorinated olefin, to hydrolysis treatment, to covert groups convertible to sulfonic acid functional groups, to the sulfonic acid functional groups.

The fluorinated monomer (S') is not particularly limited so long as it is a compound having at least one fluorine atom in the molecule, having an ethylenic double bond and having a group convertible to a sulfonic acid functional group, and a conventional one may be employed.

As the fluorinated monomer (S'), from the viewpoint of the production cost, the reactivity with other monomers and excellent properties of the obtainable fluorinated polymer, preferred is one represented by the following formula (2) or formula (3).

In the formula (2) and formula (3), $R^{f2}$ is a $C_{1-20}$ perfluoroalkyl group, which may contain an etheric oxygen atom, and which may be linear or branched. $A^2$ is a group convertible to a sulfonic acid functional group. Specifically, —SO₂F, —SO₂Cl, —SO₂Br, etc. may be mentioned.

Specific examples of the compound represented by the formula (2) may be the following ones. In the formulae, w is an integer of from 1 to 8, and x is an integer of from 1 to 5.

CF₂=CF—O—(CF₂)_w—SO₂F
CF₂=CF—O—CF₂CF(CF₃)—O—(CF₂)_w—SO₂F
CF₂=CF—[O—CF₂CF(CF₃)]_x—SO₂F

Specific examples of the compound represented by the formula (3) may be CF₂=CF—(CF₂)_w—SO₂F, and CF₂=CF—CF₂—O—(CF₂)_w—SO₂F. In the formulae, w is an integer of from 1 to 8.

As the fluorinated monomer (S'), from such a viewpoint that the industrial synthesis is easy, the following ones are preferred.

CF₂=CF—O—CF₂CF₂—SO₂F
CF₂=CF—O—CF₂CF₂CF₂—SO₂F
CF₂=CF—O—CF₂CF₂CF₂CF₂—SO₂F
CF₂=CF—O—CF₂CF(CF₃)—O—CF₂CF₂—SO₂F
CF₂=CF—O—CF₂CF(CF₃)—O—CF₂CF₂CF₂—SO₂F
CF₂=CF—O—CF₂CF(CF₃)—SO₂F
CF₂=CF—CF₂CF₂—SO₂F
CF₂=CF—CF₂CF₂CF₂—SO₂F
CF₂=CF—CF₂—O—CF₂CF₂—SO₂F

As the fluorinated monomer (S'), one type may be used alone, or two or more types may be used in combination.

In a case where the layer (Sb) 14B comprises a polymer having structural units based on a monomer having two or more sulfonic acid functional groups, it is possible to use, as a fluorinated monomer (S'), a monomer having at least one fluorine atom in the molecule, having an ethylenic double bond and having two or more groups convertible to sulfonic acid functional groups. As such a monomer, preferred is a monomer whereby a structural unit of the above formula (U1) is obtainable. As the monomer whereby a structural unit of the formula (U1) is obtainable, preferred is one represented by the following formula (m1), and more preferred are ones represented by the following formula (m11), formula (m12) and formula (m13).

In the formula (m1), r is 0 or 1, $R^{F11}$ is a single bond or a $C_{1-6}$ linear perfluoroalkylene group which may have an etheric oxygen atom, and $R^{F12}$ is a $C_{1-6}$ linear perfluoroalkylene group.

Here, the structural unit derived from a monomer represented by the formula (m1) is a structural unit of the formula (U1) wherein $Q^1$ is $OCF_2R^{F12}$ (a perfluoroalkylene group which may have an etheric oxygen atom), $Q^2$ is $R^{F11}$ (a single bond or a perfluoroalkylene group which may have an etheric oxygen atom), $SO_2X^1(SO_2R^{f1})_aM$ is $SO_2F$ or a sulfonic acid functional group ($X^1$ is an oxygen atom, a is 0, and M is hydrogen, an alkali metal or a quaternary ammonium base) obtainable by chemically converting $SO_2F$ by e.g. hydrolysis treatment, and $Y^1$ is a fluorine atom.

By using a monomer having two or more sulfonic acid functional groups, it becomes possible to increase the ion exchange group concentration per unit weight at the same monomer concentration, and thus, it becomes easy to increase the ion exchange capacity of the polymer constituting the layer (Sb) 14B without lowering the polymer molecular weight. As a result, it is possible to obtain a membrane whereby the water permeability is higher and the electrolysis voltage is low, while maintaining the caustic quality.

As the fluorinated olefin, ones exemplified above may be mentioned, and from the viewpoint of the production cost, the reactivity with other monomers and excellent properties of the obtainable fluorinate polymer, TFE is particularly preferred. As the fluorinated olefin, one type may be used alone, or two or more types may be used in combination.

In the production of the fluorinated polymer (S'), in addition to the fluorinated monomer (S') and a fluorinated olefin, other monomers may further be used. As other monomers, those exemplified above may be mentioned. By copolymerizing other monomers, it is possible to increase the flexibility or mechanical strength of the ion exchange membrane. The proportion of other monomers is, with a view to maintaining the ion exchange performance, preferably at most 30 mol % in all structural units (100 mol %) in the fluorinated polymer (S').

The ion exchange capacity of the fluorinated polymer (S) can be adjusted by changing the content of structural units derived from a fluorinated monomer (S') in the fluorinated polymer (S'). The content of sulfonic acid functional groups in the fluorinated polymer (S) is preferably the same as the content of groups convertible to sulfonic acid functional groups in the fluorinated polymer (S').

TQ value of the fluorinated polymer (S') is, from the viewpoint of the mechanical strength and membrane-forming properties as an ion exchange membrane, preferably from 150 to 350° C., more preferably from 170 to 300° C., further preferably from 200 to 250° C.

Figure 2:
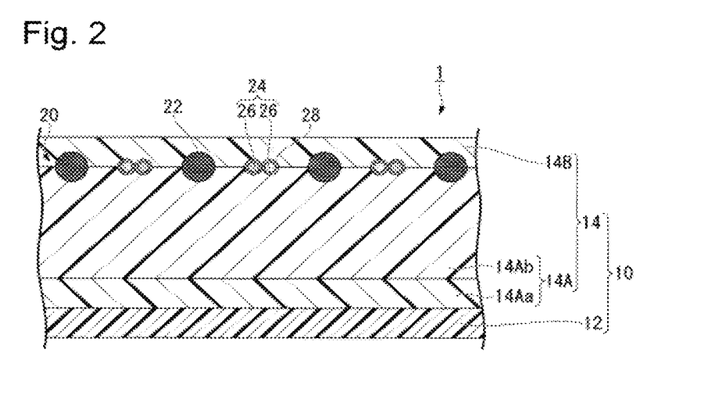
FIG. 2 is a schematic cross-sectional view of another example of the ion exchange membrane for alkali chloride electrolysis of the present invention.

In a case where the layer (Sa) 14A is formed of a plurality of layers, for example, two layers, as shown in FIG. 2, a layer in contact with the layer (C) 12 is a layer (Sa-1) 14Aa, and a layer in contact with the layer (Sb) 14B is a layer (Sa-2) 14Ab. In such a case, with respect to the layer 14Aa, from the viewpoint of adhesion to the layer 12, the ion exchange capacity of the fluorinated polymer (S) constituting the layer 14Aa is lower by preferably from 0.01 to 0.5 meq/g, more preferably from 0.03 to 0.3 meq/g, than the ion exchange capacity of the fluorinated polymer (S) constituting the layer 14Ab.

The ion exchange capacity of the layer 14Aa is preferably from 0.5 to 2.5 meq/g, more preferably from 0.6 to 2.5 meq/g, further preferably from 0.9 to 1.2 meq/g, particularly preferably from 0.9 to 1.05 meq/g. The thickness of the layer 14Aa may be any appropriate thickness at a level contributing to adhesion, and is preferably from 1 to 100 μm, more preferably from 10 to 50 μm.

<AC Resistance Value of Each Layer>

In the present invention, when measured after the ion exchange membrane is immersed and held in a 32 mass % sodium hydroxide aqueous solution warmed at 90° C. for 16 hours and subsequently immersed in a 32 mass % sodium hydroxide aqueous solution at 25° C. for 3 hours, the AC resistance value A of the layer (S) 14 and the AC resistance value B of the layer (C) 12 satisfy the following formulae at the same time. Thus, the effects as described above (low electrolysis voltage and high current efficiency) are obtainable.

$$1(\Omega \cdot cm^2) \leq A \leq 10(\Omega \cdot cm^2)$$

$$170(\Omega \cdot cm^2) \leq B \leq 550(\Omega \cdot cm^2)$$

The AC resistance value A is from 1 to 10 ($\Omega \cdot cm^2$), preferably from 1 to 9 ($\Omega \cdot cm^2$), more preferably from 1 to 8 ($\Omega \cdot cm^2$), further preferably from 3 to 7 ($\Omega \cdot cm^2$). If the AC resistance value A exceeds 10 ($\Omega \cdot cm^2$), the electrolysis voltage becomes high. Further, if the AC resistance value A is less than 1 ($\Omega \cdot cm^2$), the membrane strength tends to be low.

The AC resistance value B is from 170 to 550 ($\Omega \cdot cm^2$), preferably from 180 to 550 ($\Omega \cdot cm^2$), more preferably from 190 to 510 ($\Omega \cdot cm^2$), further preferably from 200 to 510 ($\Omega \cdot cm^2$). If the AC resistance value B exceeds 550 ($\Omega \cdot cm^2$), the electrolysis voltage becomes high. Further, if the AC resistance value B is less than 170 (Ω·cm²), the current efficiency tends to be low.

Further, the ratio (A/B) of the AC resistance value A to the AC resistance value B, is preferably at most 0.03, more preferably at most 0.023, further preferably at most 0.021, particularly preferably at most 0.015. When the ratio A/B is at most the above value, the original unit (kWh/t) of electric power required for an alkali hydroxide to be produced tends to be low, and the production at a low cost becomes possible.

The AC resistance value A of said layer (S) 14 and the AC resistance value B of said layer (C) 12 are calculated based on values measured by using a digital multimeter ZM2353 (manufactured by NF Circuit Design Block Co., Ltd.) after the ion exchange membrane is immersed in a 32 mass % sodium hydroxide aqueous solution and warmed at 90° C. for 16 hours, and subsequently immersed in a 32 mass % aqueous sodium hydroxide solution at 25° C. for 3 hours, and the details are as described in Examples given later.

Adjustment of the AC resistance value of each layer may, for example, be conducted, although not limited thereto, by the ion exchange capacity of each layer constituting the ion exchange membrane, the thickness of each layer, the water content of each layer, the composition of the aqueous alkaline solution used in the production of the ion exchange membrane (in particular, the organic solvent, and the concentration of the alkali metal hydroxide) and the treatment temperature by the aqueous alkaline solution, etc.

[Reinforcing Material]

A reinforcing material 20 is disposed in the layer (S) 14. The reinforcing material 20 is a material to reinforce the electrolyte membrane 10, and derived from a reinforcing fabric. The reinforcing fabric is composed of warp and weft, and it is preferred that the warp and the weft are orthogonal. As shown in FIG. 1, the reinforcing fabric is preferably made of reinforcing threads 22 and sacrificial threads 24.

Reinforcing threads 22 are threads made of a material that will not be eluted even when the reinforced precursor membrane (as described below) is immersed in an aqueous alkaline solution. Even after sacrificial threads 24 are eluted from the reinforcing fabric when the reinforced precursor membrane is immersed in an aqueous alkaline solution, the reinforcing threads will remain undissolved as threads constituting the reinforcing material 20 and thus will contribute to maintaining the mechanical strength and dimensional stability of the ion exchange membrane 1.

The reinforcing threads 22 are preferably threads comprising a perfluorocarbon polymer, more preferably threads comprising PTFE, further preferably threads composed solely of PTFE.

Sacrificial threads 24 are threads, of which at least a part will be eluted when the reinforced precursor membrane is immersed in an aqueous alkaline solution. Sacrificial threads 24 may be monofilaments, or may be multi-filaments.

As the sacrificial threads 24, preferred are PET threads made solely of PET, PET/PBT threads made of a mixture of PET and a polybutylene terephthalate (hereinafter referred to as PBT), PBT threads made solely of PBT, or PTT threads made solely of polytrimethylene terephthalate (hereinafter referred to as PTT), and more preferred are PET threads.

In the ion exchange membrane 1, as shown in FIG. 1, sacrificial threads 24 partially remain, and elution holes 28 are formed around dissolution residues of filaments 26 of sacrificial threads 24. Thus, breakage such as cracking tends to be less likely to occur in the ion exchange membrane 1 during the handling of the ion exchange membrane 1 after the production and before the conditioning operation for alkali chloride electrolysis, or at the time of its installation in the electrolytic bath for the conditioning operation.

Even if sacrificial threads 24 partially remain before placing the ion exchange membrane 1 in the electrolytic bath, at the time of conditioning operation for the alkali chloride electrolysis after placing the ion exchange membrane 1 in the electrolytic bath, the remaining sacrificial threads 24 will be eluted in an aqueous alkaline solution, and the majority or preferably all of them will be removed. Therefore, at the time of the main operation for the alkali chloride electrolysis using the ion exchange membrane 1, there will be no effect on the electrical resistance. After placing the ion exchange membrane 1 in the electrolytic bath, a large external force will not be exerted to the ion exchange membrane 1, and therefore, even if sacrificial threads 24 are completely eluted in the aqueous alkaline solution and removed, breakage such as cracking is less likely to occur in the ion exchange membrane 1.

Here, in FIG. 1, an embodiment is shown wherein sacrificial threads 24 partially still remain, but all of sacrificial threads 24 may be eluted.

[Inorganic Particle Layer]

The ion exchange membrane 1 may preferably further have, on at least one of its outermost surfaces, an inorganic particle layer (not shown) comprising inorganic particles and a binder. The inorganic particle layer is preferably provided on at least one of the outermost surfaces of the ion exchange membrane 1 and more preferably provided on both of the outermost surfaces.

If a gas formed by alkali chloride electrolysis adheres to the surface of the ion exchange membrane 1, the electrolysis voltage becomes high during the electrolysis. The inorganic particle layer is provided in order to suppress the adhesion of the gas formed by electrolysis to the surface of the ion exchange membrane 1, and thus to suppress an increase of the electrolysis voltage.

As the inorganic particles, preferred are ones which are excellent in corrosion resistance against an aqueous alkali chloride solution and which have a hydrophilicity. Specifically, at least one member selected from the group consisting of oxides, nitrides and carbides, of Group IV elements or Group 14 elements, is preferred, $SiO_2$, SiC, $ZrO_2$, or ZrC is more preferred, and $ZrO_2$ is particularly preferred.

The average particle diameter of the inorganic particles is preferably from 0.01 to 10 μm, more preferably from 0.01 to 1.5 μm, further preferably from 0.5 to 1.5 μm. When the average particle diameter is at least the above lower limit value, it is possible to obtain a high gas deposition suppressing effect. When the average particle size is at most the above upper limit value, the inorganic particles will be excellent in dropping resistance. Here, for the average particle diameter of the inorganic particles, the inorganic particles are observed by a scanning electron microscope (SEM), and with respect to 30 minimum particles in the SEM image, the particle sizes are measured by using an image dimension measurement software (manufactured by Innotech Corporation Pixs2000 PRO), and their average value is adopted.

As the binder, preferred is one which is excellent in corrosion resistance to an alkali chloride or an aqueous alkali hydroxide solution and which has a hydrophilicity, and a fluorinated polymer having carboxylic acid groups or sulfonic acid groups is preferred, and a fluorinated polymer having sulfonic acid groups is more preferred. The fluorinated polymer may be a homopolymer of a monomer having a carboxylic acid group or sulfonic acid group, or a copolymer of a monomer having a carboxylic acid group or sulfonic acid group and a monomer copolymerizable with such a monomer.

The mass ratio of the binder (binder ratio) to the total mass of the inorganic particles and the binder in the inorganic particle layer, is preferably from 0.1 to 0.5. When the binder ratio is at least the above lower limit value, the inorganic particles will be excellent in dropping resistance. When the binder ratio is at most the above upper limit value, it is possible to obtain a high gas deposition suppressing effect.

[Method for Producing Ion Exchange Membrane]

The method for producing an ion exchange membrane for alkali chloride electrolysis of the present invention preferably comprises the following step (i) and step (ii).

[Step (i)]

Step (i) is a step of obtaining a reinforced precursor membrane having a precursor layer (C') comprising a fluorinated polymer having groups convertible to carboxylic acid functional groups, a precursor layer (S') comprising a fluorinated polymer having groups convertible to sulfonic acid functional groups, and a reinforcing material comprising reinforcing threads disposed in the precursor layer (S').

The reinforced precursor membrane is preferably produced by disposing a reinforcing fabric as laminated, at the time of laminating the respective precursor layers for the production. The precursor layer may be a membrane composed of a single layer of a fluorinated polymer having groups convertible to ion exchange groups, or may be a membrane composed of a plurality of such layers.

Here, in step (ii) as described later, the precursor layer (C') is converted to the layer (C) 12 in FIG. 1, and the precursor layer (S') is converted to the layer (S) 14 in FIG. 1.

In the following, an example of step (i) will be described with reference to a case where the precursor layer (S') comprises a precursor layer (S'a) made of a fluorinated polymer having groups convertible to sulfonic acid functional groups, and a precursor layer (S'b) made of a fluorinated polymer having groups convertible to sulfonic acid functional groups. Here, in step (ii) as described later, the precursor layer (S'a) is converted to the layer (Sa) 14A in FIG. 1, and the precursor layer (S'b) is converted to the layer (Sb) 14B in FIG. 1.

As a method for producing a reinforced precursor membrane, a method may, for example, be mentioned wherein firstly a laminated membrane having a precursor layer (C') and a precursor layer (S'a) is obtained by a co-extrusion method. Separately, a membrane made of a precursor layer (S'b) is obtained by a single layer extrusion method.

Then, the above membrane made of the precursor layer (S'b), a reinforcing material and the laminated membrane are disposed in this order, and they are laminated by laminating rolls or by a vacuum lamination apparatus. At that time, the laminated membrane is disposed so that the precursor layer (S'a) side is in contact with the reinforcing material. In the reinforced precursor membrane thus obtained, the precursor layer (S'b), the reinforcing material, the precursor layer (S'a) and the precursor layer (C') are laminated in this order.

Further, in the case of making the layer (Sa) to be formed of two or more layers, separately a membrane comprising layer(s) made of a fluorinated polymer having groups convertible to sulfonic acid functional groups, may be obtained and laminated between the reinforcing material and the above laminated membrane so that the layer (Sa) will be formed of a plurality of layers.

[Step (ii)]

Step (ii) is a step of obtaining the ion exchange membrane for alkali chloride electrolysis by contacting the reinforced precursor membrane obtained as described above and an aqueous alkaline solution, to convert the groups convertible to carboxylic acid functional groups in said precursor layer (C') to the carboxylic acid functional groups to form the layer (C), and to convert the groups convertible to sulfonic acid functional groups in said precursor layer (S') to the a sulfonic acid functional groups to form the layer (S). Further, in this step, at least a part of sacrificial threads contained in the reinforced precursor membrane will be eluted by the action of the aqueous alkaline solution.

In step (ii), the precursor layer (C') is converted to the layer (C) 12 shown in FIG. 1, and the precursor layer (S') is converted to the layer (S) 14 shown in FIG. 1, respectively. Further, as described above, in a case where the precursor layer (S') comprises a precursor layer (S'a) and a precursor layer (S'b), the precursor layer (S'a) is converted to the layer (Sa) 14A shown in FIG. 1, and the precursor layer (S'b) is converted to the layer (Sb) 14B in FIG. 1, respectively.

Further in a case where the layer (Sa) 14A is formed of a plurality of layers, for example, two layers, as shown in FIG. 2, the layer (Sa-1) 14Aa and the layer (Sa-2) 14Ab constitute the layer (Sa) 14A, which constitutes the layer (S) 14 together with the layer (Sb) 14B.

The method of contacting the reinforced precursor membrane and an aqueous alkaline solution may be a method of immersing the reinforced precursor membrane in an aqueous alkaline solution, or a method of spraying an aqueous alkaline solution on the surface of the reinforced precursor membrane.

The temperature of the aqueous alkaline solution is preferably from 30 to 100° C., more preferably from 40 to 100° C., further preferably from 45 to 100° C. Thus, it becomes easy to adjust the AC resistance value of each layer to be in the above-mentioned range.

In particular, in step (ii), if the temperature of the aqueous alkaline solution is changed for each layer, it tends to be easy to lower the resistance of the layer (S) and to increase the resistance of the layer (C), and, as a result, it becomes easy to adjust the AC resistance value of each layer to be in the above-mentioned range. Specifically, in a case where the precursor layer (C') is in contact with the aqueous alkaline solution, the temperature of the aqueous alkaline solution is preferably from 30 to 95° C., more preferably from 30 to 80° C. Further, in a case where the precursor layer (S') is in contact with the aqueous alkaline solution, the temperature of the aqueous alkaline solution is preferably higher by from 10 to 50° C., preferably from 40 to 100° C., more preferably from 60 to 100° C., than in the case of said precursor layer (C').

The contact time of the reinforced precursor membrane and the aqueous alkaline solution is preferably from 3 to 100 minutes, more preferably from 5 to 50 minutes.

Thus, it becomes easy to adjust the AC resistance value of each layer to be in the above-mentioned range.

In step (ii), after contact of the reinforced precursor membrane and the aqueous alkaline solution, treatment to remove the aqueous alkaline solution may be carried out. The method for removing the aqueous alkaline solution may, for example, be a method of washing with water the reinforced precursor membrane which has been contacted with the aqueous alkaline solution.

As described above, the conversion of groups convertible to carboxylic acid functional groups and groups convertible to sulfonic acid functional groups, and the elution of sacrificial threads are carried out by an aqueous alkaline solution.

The aqueous alkaline solution preferably comprises an alkali metal hydroxide, a water-soluble organic solvent and water from such a viewpoint that it becomes easy to adjust the AC resistance value of each layer to be in the above-mentioned range.

The alkali metal hydroxide may be sodium hydroxide or potassium hydroxide. The concentration of the alkali metal hydroxide is, in the aqueous alkaline solution (100 mass %), preferably from 1 to 60 mass %, more preferably from 3 to 55 mass %, further preferably from 5 to 50 mass %. When the concentration is at least the above lower limit value, it is easy to adjust the AC resistance value B of the layer (C) to be in the above range. Further, when the concentration is at most the above upper limit value, it is easy to adjust the AC resistance value A of the layer (S) to be in the above range.

In the present invention, the water-soluble organic solvent is meant for an organic solvent that is readily soluble in water, and specifically, preferred is an organic solvent with a solubility of at least 0.1 g in 1,000 ml of water (20° C.), and more preferred is an organic solvent with the solubility of at least 0.5 g.

The water-soluble organic solvent preferably contains, from such a viewpoint that it becomes easy to adjust the AC resistance value A of the layer of (S) and the AC resistance value B of the layer (C) to be within the above-mentioned ranges, at least one member selected from the group consisting of aprotic organic solvents, alcohols and amino alcohols, and more preferably contains an aprotic organic solvent. As the water-soluble organic solvent, one type may be used alone, or two or more types may be used in combination.

The aprotic organic solvents include dimethyl sulfoxide (DMSO), N,N-dimethylformamide (DMF), N,N-dimethylacetamide, N-methyl-2-pyrrolidone (NMP) and N-ethyl-2-pyrrolidone, etc., and among them, dimethyl sulfoxide is preferred.

The alcohols include methanol, ethanol, isopropanol, butanol, methoxy ethoxy ethanol, butoxy ethanol, butyl carbitol, hexyloxy ethanol, octanol, 1-methoxy-2-propanol and ethylene glycol, etc.

The amino alcohols include ethanolamine, N-methyl ethanolamine, N-ethyl ethanolamine, 1-amino-2-propanol, 1-amino-3-propanol, 2-amino ethoxy ethanol, 2-aminothiophenol ethoxyethanol, and 2-amino-2-methyl-1-propanol, etc.

The concentration of the water-soluble organic solvent is, in the aqueous alkaline solution (100 mass %), preferably from 1 to 60 mass %, more preferably from 3 to 55 mass %, further preferably from 4 to 50 mass %. When the concentration of the water-soluble organic solvent is at least the above lower limit value, it is easy to adjust the AC resistance value A of the layer (S) to be in the above range. Further, when the concentration of the water-soluble organic solvent is at most the above upper limit value, it is easy to adjust the AC resistance value B of the layer (C) to be in the above range.

The concentration of water in the aqueous alkaline solution (100 mass %) is preferably from 39 to 80 mass %.

As a preferred method of adjusting the AC resistance value of each layer to be within the above range, a method of changing the composition of the aqueous alkaline solution in step (ii) for each layer may be mentioned.

Specifically, a method may be mentioned wherein in step (ii), as the aqueous alkaline solution, two types of aqueous alkaline solution, i.e. the first aqueous alkaline solution and the second aqueous alkaline solution, are prepared, and the precursor layer (C') is brought in contact with the first aqueous alkaline solution, and the precursor layer (S') is brought in contact with the second aqueous alkaline solution. Here, between the first aqueous alkaline solution and the second aqueous alkaline solution, at least one of the composition and the temperature is different from each other.

The treatment for contacting the precursor layer (C') to the first aqueous alkaline solution, and the treatment for contacting the precursor layer (S') to the second aqueous alkaline solution, may be conducted simultaneously, or may be conducted separately. Further, after contacting the respective layers to the aqueous alkaline solutions, as described above, the aqueous alkaline solutions may be removed from the respective layers, and also with respect to the removal of the aqueous alkaline solutions, the removal may be carried out at the same time, or may be carried out separately.

The method of conducting the treatments with the aqueous alkaline solutions separately may, for example, be a method wherein after contacting the precursor layer (S') to the second aqueous alkaline solution, the second aqueous alkaline solution is removed from the precursor layer (S'), and then, the precursor layer (C') is contacted to the first aqueous alkaline solution, whereupon the first aqueous alkaline solution is removed from the precursor layer (C'). Here, an example is shown wherein treatments with the aqueous alkaline solutions are conducted in the order of the precursor layer (S') and then the precursor layer (C'), but treatments with the aqueous alkaline solutions may be conducted in the order of the precursor layer (C') and then the precursor layer (S').

The first aqueous alkaline solution used in the treatment of the precursor layer (C') is one embodiment of the above-mentioned aqueous alkaline solution and preferably comprises an alkali metal hydroxide, a water-soluble organic solvent and water. With respect to specific preferred examples of the respective components, the concentration of the alkali metal hydroxide is, in the first aqueous alkaline solution (100 mass %), preferably from 1 to 60 mass %, more preferably from 5 to 60 mass %, further preferably from 10 to 60 mass %. When the concentration of the alkali metal hydroxide is within the above range, it is easy to lower the AC resistance value of the layer (C), and it is easy to adjust the AC resistance value B to be within the above-mentioned range.

The concentration of the water-soluble organic solvent is, in the first aqueous alkaline solution (100 mass %), preferably from 1 to 60 mass %, more preferably from 1 to 40 mass %, further preferably from 1 to 30 mass %. When the concentration of the water-soluble organic solvent is within the above the range, it is easy to lower the AC resistance value of the layer (C), and it is easy to adjust the AC resistance value B to be within the above-mentioned range. The concentration of water is, in the first aqueous alkaline solution (100 mass %), preferably from 39 to 80 mass %.

The second aqueous alkaline solution used in the treatment of the precursor layer (S') is one embodiment of the above-mentioned aqueous alkaline solution and preferably comprises an alkali metal hydroxide, a water-soluble organic solvent and water. With respect to specific preferred examples of the respective components, the concentration of the alkali metal hydroxide is, in the second aqueous alkaline solution (100 mass %), preferably from 1 to 60 mass %, more preferably from 3 to 50 mass %. When the concentration of the alkali metal hydroxide is within the above the range, it is easy to increase the AC resistance value of the layer (S), and it is easy to adjust the AC resistance value A to be within the above-mentioned range.

The concentration of the water-soluble organic solvent is, in the second aqueous alkaline solution (100 mass %), preferably from 1 to 60 mass %, more preferably from 4 to 50 mass %. When the concentration of the water-soluble organic solvent is within the above range, it is easy to increase the AC resistance value of the layer (S), and it is easy to adjust the AC resistance value A to be within the above-mentioned range. The concentration of water is, in the second aqueous alkaline solution (100 mass %), preferably from 39 to 80 mass %.

Further, in step (ii), after converting the groups convertible to carboxylic acid functional groups and the groups convertible to sulfonic acid functional groups, to the carboxylic acid functional groups and the sulfonic acid functional groups (hereinafter referred to also as ion exchange groups), respectively, as the case requires, salt exchange to replace the counter cations of the ion exchange groups may be conducted. In the salt exchange, for example, the counter cations of the ion exchange groups may be changed from potassium to sodium. For the salt exchange, a known method may be adopted.

[Electrolysis Apparatus]

The alkali chloride electrolysis apparatus of the present invention comprises an electrolytic bath provided with a cathode and an anode, and the above-described ion exchange membrane for alkali chloride electrolysis, wherein the ion exchange membrane for alkali chloride electrolysis is disposed in the electrolytic bath so as to partition said cathode and said anode, and said layer (C) of the ion exchange membrane for alkali chloride electrolysis is disposed on the cathode side, and said layer (S) of the ion exchange membrane for alkali chloride electrolysis is disposed on the anode side.

According to the alkali chloride electrolysis apparatus of the present invention, because it has the ion exchange membrane for alkali chloride electrolysis as described above, at the time of the electrolysis of an alkali chloride, it is possible to lower the electrolysis voltage and to increase the current efficiency.

Figure 3:
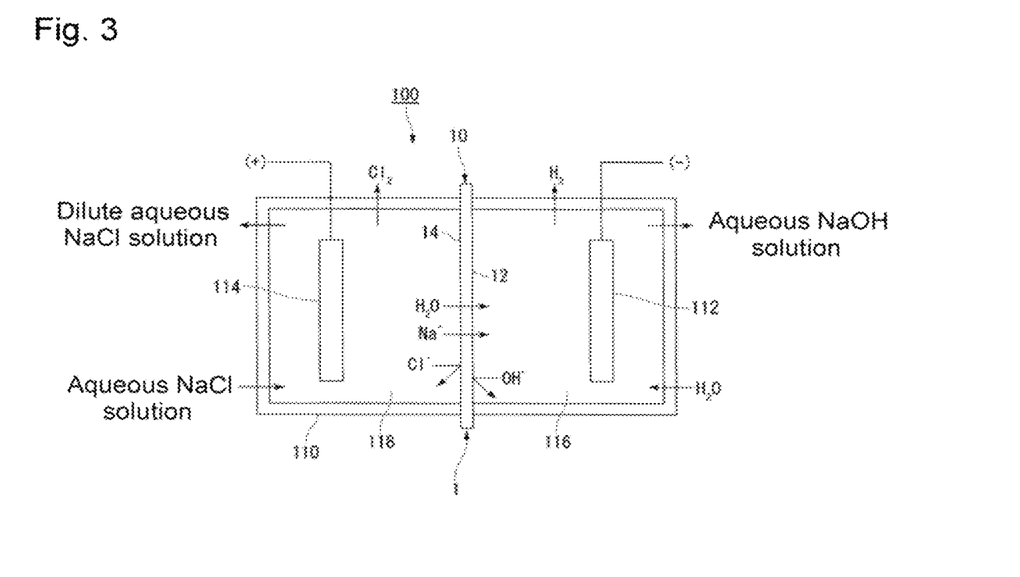
FIG. 3 is a schematic diagram showing an example of the alkali chloride electrolysis apparatus of the present invention.

One embodiment of the alkali chloride electrolysis apparatus of the present invention will be described with reference to the schematic FIG. 3. The alkali chloride electrolysis apparatus 100 of this embodiment comprises an electrolyte bath 110 provided with a cathode 112 and an anode 114, and an ion exchange membrane 1 mounted in the electrolytic bath 110 so as to partition inside of the electrolytic bath 110 into a cathode chamber 116 on the cathode 112 side and an anode chamber 118 on the anode 114 side.

As shown in FIG. 1, the ion exchange membrane 1 has an electrolyte membrane 10 made of a layer (C) 12 and a layer (S) 14, and a reinforcing material 20 disposed in the layer (S). The ion exchange membrane 1 is mounted in the electrolytic bath 110 so that the layer (C) 12 is located on the cathode 112 side, and the layer (S) 14 is located on the anode 114 side. The cathode 112 may be placed in contact with the ion exchange membrane 1 or may be placed with a space from the ion exchange membrane 1.

The material constituting the cathode chamber 116 is preferably a material which is resistant to an alkali hydroxide and hydrogen. Such a material may be stainless steel, nickel, etc. The material constituting the anode chamber 118 is preferably a material which is resistant to an alkali chloride and chlorine. Such a material may be titanium, etc.

As the base material for the cathode, from the viewpoint of resistance to an alkali hydroxide and hydrogen or processability, preferred is stainless steel, nickel, etc. As the base material for the anode, from the viewpoint of resistance to an alkali chloride and chlorine or processability, preferred is titanium.

The surface of the anode substrate is preferably coated with, for example, ruthenium oxide, iridium oxide, etc. The surface of the cathode substrate is preferably coated with, for example, Raney nickel, etc.

[Method for Producing Alkali Hydroxide]

The method for producing an alkali hydroxide of the present invention is carried out by electrolyzing an aqueous alkali chloride solution by means of the alkali chloride electrolysis apparatus of the present invention. It is possible to employ a known embodiment except that the method is carried out by means of the alkali chloride electrolysis apparatus of the present invention.

For example, in the case of preparing an aqueous sodium hydroxide solution by electrolyzing an aqueous sodium chloride solution, the aqueous sodium chloride solution is electrolyzed by supplying an aqueous sodium chloride solution to the anode chamber 118 of the alkali chloride electrolysis apparatus 100, and supplying an aqueous sodium hydroxide solution to the cathode chamber 116 while maintaining the concentration of the aqueous sodium hydroxide discharged from the cathode chamber 116 to be at a predetermined concentration (e.g. 32 mass %).

EXAMPLES

In the following, the present invention will be described in detail with reference to Examples. However, the present invention is not limited to these Examples. Further, the blend amounts of the respective components in Table given later are based on mass.

[Measurement of TQ Value]

TQ value was obtained as a temperature showing a volume flow rate of 100 mm$^3$/sec. The volume flow rate was regarded as the amount of the polymer (unit: mm$^3$/sec.) flowing out, when the target polymer was melted and permitted to flow out from an orifice (diameter: 1 mm, length: 1 mm) at a constant temperature under a pressure of 3 MPa (gauge pressure) by using a Shimadzu Flow Tester CFD-100D (manufactured by Shimadzu Corporation).

[Calculation of Ion Exchange Capacity]

About 0.5 mg of a fluorinated polymer having groups convertible to ion exchange groups was flat-pressed at a temperature higher by about 10° C. than its TQ value into a film shape, and the obtained film-shaped sample was analyzed by a transmission infrared spectrometer. Using the respective peak heights of $CF_2$ peak, $CH_3$ peak, OH peak, CF peak and $SO_2F$ peak in the obtained spectrum, the proportion of structural units having groups convertible to carboxylic acid functional groups or sulfonic acid functional groups, was calculated, and regarding this as the proportion of structural units having carboxylic acid functional groups or sulfonic acid functional groups in the fluorinated polymer obtainable after hydrolysis treatment, and using a sample with a known ion exchange capacity as a calibration curve, the ion exchange capacity was obtained.

Further, also with respect to a film having ion exchange groups, of which the terminal group is an acid form or a potassium form or a sodium-form, the measurement is likewise possible.

[Thickness of Layer]

With respect to the thickness of each layer when dried in an ion exchange membrane or in a reinforced precursor membrane, after drying the ion exchange membrane at 90° C. for 2 hours, the cross section of the ion exchange membrane was observed by an optical microscope, and by using an imaging software (manufactured by Innotech Corporation Pixs2000 PRO), the thickness of each layer was measured at 10 points at positions where the reinforcing threads and sacrificial threads constituting the reinforcing material were not present, and the average value thereof was obtained.

[Calculation of Ac Resistance Value]

The AC resistance values of the layer (S) and the layer (C) were calculated as follows.

First, if the outermost surface of an ion exchange membrane constituted by the layer (S) and the layer (C) contained an inorganic particle layer, the inorganic particle layer was wiped off, then, the ion exchange membrane was immersed in a 32 mass % sodium hydroxide aqueous solution and held warmed at 90° C. for 16 hours, and then, the 32 mass % sodium hydroxide aqueous solution was returned to 25° C., and the ion exchange membrane was left to stand still in the sodium hydroxide aqueous solution for 3 hours.

Then, the ion exchange membrane was immediately put in an AC resistance measurement cell with an effective current area of 1.77 cm$^2$ and inserted between two platinum black electrodes, whereupon a 32 mass % sodium hydroxide aqueous solution was filled in the cell. Then, to platinum terminals connected to the electrodes, a digital multimeter ZM2353 (manufactured by NF Circuit Design Block Co., Ltd.) was connected to let AC resistance of 1,000 Hz be applied, and the resistance value $R_M$ (Ω) inclusive of liquid resistance was measured. Then, the ion exchange membrane was withdrawn from the cell, and the liquid resistance inclusive $R_E$ (Ω) was measured. From the above two resistance values, the AC resistance $R_{C+S}$ (Ω·cm$^2$) of the entire membrane was calculated from the following formula.

$$R_{C+S}=(R_M-R_E)\times 1.77$$

Then, the layer (C) was peeled off from the ion exchange membrane to a state of the layer (S) only, whereupon in the same manner as described above, the resistance value $R_{MS}$ (Ω) inclusive of liquid resistance and the liquid resistance $R_{ES}$ (Ω) were measured, and the AC resistance value A (Ω·cm$^2$a) of the layer (S) was obtained from the following formula.

$$A=(R_{MS}-R_{ES})\times 1.77$$

Further, the AC resistance value B (Ω·cm$^2$) of the layer (C) was obtained from the following formula.

$$B=R_{C+S}-A$$

Further, the ratio (A/B) of the AC resistance value A of the layer (S) to the AC resistance value B of the layer (C) was obtained.

[Measurements of Electrolysis Voltage and Current Efficiency]

The ion exchange membrane was disposed in a test electrolytic bath with an effective current area of 1.5 dm$^2$ (electrolytic surface: rectangular of vertical 150 mm×horizontal 100 mm) so that the layer (C) faced the cathode, and using as the anode, one having titanium punched metal (opening: short diameter 4 mm, long diameter 8 mm) covered with a solid solution of ruthenium oxide and iridium oxide, and using as a cathode, one having SUS 304 steel punched metal (aperture: short diameter 5 mm, long diameter 10 mm) covered with electrodeposited ruthenium-containing Raney nickel, they were installed so that both electrodes and the ion exchange membrane were directly in contact, so as not to form a gap.

While adjusting the concentration of sodium hydroxide discharged from the cathode chamber to be 32 mass %, and the concentration of sodium chloride supplied to the anode chamber to be 200 g/L, electrolysis of an aqueous sodium chloride solution was conducted under conditions of a temperature of 90° C. and a current density of 6 kA/m$^2$, and the electrolysis voltage (V) and the current efficiency (%) after 3 to 10 days from the initiation of operation were measured.

[Calculation of Electric Power Consumption Rate]

The electric power consumption rate is expressed as the amount of electric power required to produce 1 t of caustic soda, and was calculated using the following formula from the electrolysis voltage and the current efficiency.

Electric power consumption rate (kWh/t-NaOH)= (670×electrolysis voltage (V))/(current efficiency (%)/100)

Example 1

TFE and a fluorinated monomer represented by the following formula (X) were copolymerized to synthesize a fluorinated polymer having groups convertible to carboxylic acid functional groups (ion exchange capacity after hydrolysis: 1.08 meq/g) (polymer C).

$$CF_2=CF-O-CF_2CF_2CF_2-COOCH_3 \quad (X)$$

TFE and a fluorinated monomer represented by the following formula (Y) were copolymerized to synthesize a fluorinated polymer having groups convertible to sulfonic acid functional groups (ion exchange capacity after hydrolysis: 1.10 meq/g) (polymer S1).

$$CF_2=CF-O-CF_2CF(CF_3)-O-CF_2CF_2-SO_2F \quad (Y)$$

TFE and a fluorinated monomer represented by the formula (Y) were copolymerized to synthesize a fluorinated polymer having groups convertible to sulfonic acid functional groups (ion exchange capacity after hydrolysis: 1.10 meq/g) (polymer S2).

The polymer C and the polymer S1 were molded by a coextrusion method to obtain a film A of a two-layer structure consisting of a precursor layer (C') (thickness: 12 μm) made of the polymer C and a precursor layer (S'a) (thickness: 68 μm) made of the polymer S1.

The polymer S2 was molded by a melt extrusion method to obtain a film B of a precursor layer (S'b) (thickness: 30 μm) made of the polymer S2.

A PTFE film was rapidly stretched and then slit into a width of 100 denier to obtain a monofilament, which was twisted 2,000 times/m to obtain a PTFE thread, which was used as a reinforcing thread. A PET thread made of a multi-filament of 30 denier having six PET filaments of 5 denier aligned, was used as a sacrificial thread. Plain weave was conducted so that one reinforcing thread and two sacrificial threads were alternately disposed, to obtain a reinforcing fabric (the density of reinforcing threads: 27 threads/inch, the density of sacrificial threads: 108 threads/inch).

Using the film A, the film B and the reinforcing fabric obtained as described above, an ion exchange membrane 1 corresponding to the embodiment of FIG. 1 was produced as follows.

The film B, the reinforcing fabric, the film A and a releasing PET film (thickness: 100 μm) were overlaid in this order so that the precursor layer (C') of the film A was located on the releasing PET film side, and laminated by means of rolls. The releasing PET film was peeled off to obtain a reinforced precursor membrane. The thicknesses of the respective layers in the reinforced precursor membrane were such that the precursor layer (C') was 12 µm, the precursor layer (S'a) was 68 µm, and the precursor layer (S'b) was 30 µm. Here, the precursor layer (S'a) and the precursor layer (S'b) constitutes the precursor layer (S').

A paste comprising 29.0 mass % of zirconium oxide (average particle diameter: 1 µm), 1.3 mass % of methyl cellulose, 4.6 mass % of cyclohexanol, 1.5 mass % of cyclohexane and 63.6 mass % of water, was transferred onto upper side of the precursor layer (S') of the reinforced precursor membrane (i.e. the precursor layer (S'b)) by a roll press, to form an inorganic particle layer. The attached amount of zirconium oxide was 20 g/m².

The reinforced precursor membrane having the inorganic particle layer formed on one side was, in such a state that the outer periphery was sealed with a PTFE packing, treated for 10 minutes by letting only the precursor layer (S') side be in contact with a first aqueous alkaline solution of 40 mass % of dimethyl sulfoxide and 10 mass % of potassium hydroxide heated to 95° C.

The first aqueous alkaline solution was removed by washing with water, and then, only the precursor layer (C') side was brought in contact with a second aqueous alkaline solution of 5 mass % of dimethyl sulfoxide and 30 mass % of potassium hydroxide heated to 55° C. and treated for 120 minutes, whereupon the second aqueous alkaline solution was removed by washing with water. Thus, —COOCH₃ of the polymer C and —SO₂F of the polymer S1 and polymer S2 were hydrolyzed and converted to ion exchange groups, to obtain a membrane wherein the precursor layer (C') was converted to the layer (C), the precursor layer (S'a) was converted to the layer (Sa), and the layer (S'b) was converted to the layer (Sb).

In an ethanol solution containing 2.5 mass % of an acid-form polymer of polymer S1, zirconium oxide (average particle diameter: 1 µm) was dispersed at a concentration of 13 mass % to prepare a dispersion. This dispersion was sprayed on the layer (C) side of the above membrane, to form an inorganic particle layer. The attached amount of zirconium oxide was 3 g/m².

Further, the dried thicknesses of the layer (S) and the layer (C) of the obtained ion exchange membrane were measured. The measurement results are shown in Table 1.

Example 2

A reinforced precursor membrane was obtained in the same manner as in Example 1 except that as the polymer S2, a fluorinated polymer having groups convertible to sulfonic acid functional groups (ion exchange capacity after hydrolysis: 1.7 meq/g) obtained by copolymerizing TFE and a monomer represented by the formula (Z), was used.

(Z)

A paste comprising 29.0 mass % of zirconium oxide (average particle diameter: 1 µm), 1.3 mass % of methyl cellulose, 4.6 mass % of cyclohexanol, 1.5 mass % of cyclohexane and 63.6 mass % of water, was transferred onto upper side of the precursor layer (S') of the reinforced precursor membrane (i.e. the precursor layer (S'b)) by a roll press, to form an inorganic particle layer. The attached amount of zirconium oxide was 20 g/m².

The reinforced precursor membrane having the inorganic particle layer formed on one side was immersed in an aqueous alkaline solution of 5 mass % of dimethyl sulfoxide and 30 mass % of potassium hydroxide at 95° C. for 8 minutes. Thus, —COOCH₃ of the polymer C and —SO₂F of the polymer S1 and the polymer S2 were hydrolyzed and converted to ion exchange groups, to obtain a membrane wherein the precursor layer (C') was converted to the layer (C), the precursor layer (S'a) was converted to the layer (Sa), and the precursor layer (S'b) was converted to the layer (Sb).

In an ethanol solution containing 2.5 mass % of an acid-form polymer of polymer S1, zirconium oxide (average particle diameter: 1 µm) was dispersed at a concentration of 13 mass % to prepare a dispersion. This dispersion was sprayed on the layer (C) side of the above membrane, to form an inorganic particle layer. The attached amount of zirconium oxide was 3 g/m².

Example 3

An ion exchange membrane was obtained in the same manner as in Example 2, except that as the polymer S2, a fluorinated polymer having groups convertible to sulfonic acid functional groups (ion exchange capacity: 1.5 meq/g) obtained by copolymerizing TFE and a fluorinated monomer represented by the formula (Z), was used.

Example 4

A reinforced precursor membrane having an inorganic particle layer formed on one side, obtained in the same manner as in Example 2, was, in such a state that the outer periphery of the membrane was sealed with a PTFE packing, treated for 10 minutes by letting only the precursor layer (S') side be brought in contact with a first aqueous alkaline solution of 40 mass % of dimethyl sulfoxide and 10 mass % of potassium hydroxide heated to 95° C.

The first aqueous alkaline solution was removed by washing with water, and then, treatment was conducted for 8 minutes by letting only the precursor layer (C') side be brought in contact with a second aqueous alkaline solution of 5 mass % of dimethylsulfoxide and 30 mass % of potassium hydroxide heated to 95° C., whereupon the second aqueous alkaline solution was removed by washing with water. Thus, —COOCH₃ of the polymer C and —SO₂F of the polymer S1 and the polymer S2 were hydrolyzed and converted to ion exchange groups, to obtain a membrane wherein the precursor layer (C') was converted to the layer (C), the precursor layer (S'a) was converted to the layer (Sa), and the precursor layer (S'b) was converted to the layer (Sb).

In an ethanol solution containing 2.5 mass % of an acid-form polymer of polymer S1, zirconium oxide (average particle diameter: 1 µm) was dispersed at a concentration of 13 mass % to prepare a dispersion. This dispersion was sprayed on the layer (C) side of the above membrane, to form an inorganic particle layer. The attached amount of zirconium oxide was 3 g/m².

Further, the dried thicknesses of the layer (S) and the layer (C) of the obtained ion exchange membrane were measured. The measurement results are shown in Table 1.

Example 5

An ion exchange membrane was obtained in the same manner as in Example 1, except that, as the polymer S2, a fluorinated polymer having groups convertible to sulfonic acid functional groups (ion exchange capacity: 1.7 meq/g) obtained by copolymerizing TFE and a fluorinated monomer represented by the formula (Z), was used.

Example 6

An ion exchange membrane was obtained in the same manner as in Example 1, except that, as the polymer C, a fluorinated polymer having groups convertible to carboxylic acid functional groups (ion exchange capacity after hydrolysis: 1.06 meq/g) obtained by copolymerizing TFE and a fluorinated monomer represented by the following formula (X), was used, and as the polymer S2, a fluorinated polymer having groups convertible to sulfonic acid functional groups (ion exchange capacity: 1.0 meq/g) obtained by copolymerizing TFE and a fluorinated monomer represented by the formula (Y), was used.

Example 7

An ion exchange membrane was obtained in the same manner as in Example 4, except that, as the polymer S2, a fluorinated polymer having groups convertible to sulfonic acid functional groups (ion exchange capacity: 1.1 meq/g) obtained by copolymerizing TFE and a fluorinated monomer represented by the formula (Y), was used.

Example 8

An ion exchange membrane was obtained in the same manner as in Example 4, except that, as the polymer C, a fluorinated polymer having groups convertible to carboxylic acid functional groups (ion exchange capacity after hydrolysis: 1.06 meq/g) obtained by copolymerizing TFE and a fluorinated monomer represented by the following formula (X), was used, and as the polymer S2, a fluorinated polymer having groups convertible to sulfonic acid functional groups (ion exchange capacity: 1.0 meq/g) obtained by copolymerizing TFE and a fluorinated monomer represented by the formula (Y), was used.

Comparative Example 1

First, a reinforced precursor membrane obtained in the same manner as in Example 1 was prepared.

Next, a paste comprising 29.0 mass % of zirconium oxide (average particle diameter: 1 μm), 1.3 mass % of methyl cellulose, 4.6 mass % of cyclohexanol, 1.5 mass % of cyclohexane and 63.6 mass % of water, was transferred onto upper layer side of the precursor layer (S') of the reinforced precursor membrane (i.e. the precursor layer (S'b)) by a roll press, to form an inorganic particle layer. The attached amount of zirconium oxide was 20 g/m².

The reinforced precursor membrane having the inorganic particle layer formed on one side was immersed at 95° C. for 10 minutes in an aqueous alkaline solution of 40 mass % of dimethyl sulfoxide and 10 mass % of potassium hydroxide. Thus, —COOCH$_3$ of the polymer C and —SO$_2$F of the polymer S1 and the polymer S2 were hydrolyzed and converted to ion exchange groups, to obtain a membrane wherein the precursor layer (C') was converted to the layer (C), the precursor layer (S'a) was converted to the layer (Sa), and the precursor layer (S'b) was converted to the layer (Sb).

In an ethanol solution containing 2.5 mass % of an acid-form polymer of polymer S1, zirconium oxide (average particle diameter: 1 μm) was dispersed at a concentration of 13 mass % to prepare a dispersion. This dispersion was sprayed on the layer (C) side of the above membrane, to form an inorganic particle layer. The attached amount of zirconium oxide was 3 g/m².

Comparative Example 2

An ion exchange membrane was obtained in the same manner as in Example 2, except that, as the polymer S2, a fluorinated polymer having groups convertible to sulfonic acid functional groups (ion exchange capacity after hydrolysis: 1.1 meq/g) obtained by copolymerizing TFE and a fluorinated monomer represented by the formula (Y), was used, and the immersion conditions in the aqueous alkaline solution were changed to 55° C. for 120 minutes.

Comparative Example 3

An ion exchange membrane was obtained in the same manner as in Example 2, except that, as the polymer S2, a fluorinated polymer having groups convertible to sulfonic acid functional groups (ion exchange capacity after hydrolysis: 1.1 meq/g) obtained by copolymerizing TFE and a fluorinated monomer represented by the formula (Y), was used.

The current efficiency of the ion exchange membrane, the electrolysis voltage, the electric power consumption rate, the AC resistance values of the respective layers of the ion exchange membrane, and the ratio of the AC resistance values (the above A/B) in each of Examples and Comparative Examples, are shown in Table 1. In the Table, AR represents an ion exchange capacity, and treatment to let the reinforced precursor membrane and the aqueous alkaline solution be brought in contact, was represented simply as "Hydrolysis treatment". Further, in the Table, S' represents the precursor layer (S'), C' represents the precursor layer (C'), and both sides mean both of the precursor layer (S') side and precursor layer (C') side.

TABLE 1

|  |  |  |  | Example 1 | Example 2 | Example 3 | Example 4 | Example 5 | Example 6 |
|---|---|---|---|---|---|---|---|---|---|
| Membrane construction | Layer (Sb) | AR | meq/g | 1.1 | 1.7 | 1.5 | 1.7 | 1.7 | 1 |
|  |  | Precursor thickness | μm | 30 | 30 | 30 | 30 | 30 | 30 |
|  | Layer (Sa) | AR | meq/g | 1.1 | 1.1 | 1.1 | 1.1 | 1.1 | 1.1 |
|  |  | Precursor thickness | μm | 68 | 68 | 68 | 68 | 68 | 68 |
|  | Layer (Sa) (Layer (Sa) + Layer (Sb)) | Dried thickness | μm | 109 | 93 | 117 | 110 | 105 | 108 |
|  | Layer (C) | AR | meq/g | 1.08 | 1.08 | 1.08 | 1.08 | 1.08 | 1.06 |
|  |  | Precursor thickness | μm | 12 | 12 | 12 | 12 | 12 | 12 |
|  |  | Dried thickness | μm | 14 | 16 | 15 | 15 | 14 | 15 |

TABLE 1-continued

| Conditions for hydrolysis treatment | Hydrolysis treatment (1st time) | Composition | DMSO/KOH/water (composition ratio: mass %) | 40/10/50 | 5/30/65 | 5/30/65 | 40/10/50 | 40/10/50 | 40/10/50 |
|---|---|---|---|---|---|---|---|---|---|
| | | Temperature | °C. | 95 | 95 | 95 | 95 | 95 | 95 |
| | | Time | min. | 10 | 8 | 8 | 10 | 10 | 10 |
| | | Treated side(s) | S'/C' | Only S' side | Both sides | Both sides | Only S' side | Only S' side | Only S' side |
| | Hydrolysis treatment (2nd time) | Composition | DMSO/KOH/water (composition ratio: mass %) | 5/30/65 | — | — | 5/30/65 | 5/30/65 | 5/30/65 |
| | | Temperature | °C. | 55 | — | — | 95 | 55 | 55 |
| | | Time | min. | 120 | — | — | 8 | 120 | 120 |
| | | Treated side(s) | S/C | Only C' side | — | — | Only C' side | Only C' side | Only C' side |
| Ac resistance value | | S layer (A) | Ω·cm² | 7 | 4 | 6 | 2 | 2 | 9 |
| | | C layer (B) | Ω·cm² | 422 | 215 | 311 | 201 | 450 | 500 |
| | | A/B | — | 0.017 | 0.019 | 0.019 | 0.010 | 0.004 | 0.018 |
| Electrolysis performance | | Current efficiency | % | 97.6 | 96.5 | 97.3 | 96.5 | 97.8 | 98.1 |
| | | Electrolysis voltage | V | 3.08 | 3.02 | 3.06 | 2.99 | 3.02 | 3.09 |
| | | Electric power consumption rate | kWh/t-NaOH | 2,114 | 2,097 | 2,107 | 2,076 | 2,069 | 2,112 |

| | | | | Example 7 | Example 8 | Comp. Example 1 | Comp. Example 2 | Comp. Example 3 |
|---|---|---|---|---|---|---|---|---|
| Membrane construction | Layer (Sb) | AR | meq/g | 1.1 | 1 | 1.1 | 1.1 | 1.1 |
| | | Precursor thickness | μm | 30 | 30 | 30 | 30 | 30 |
| | Layer (Sa) | AR | meq/g | 1.1 | 1.1 | 1.1 | 1.1 | 1.1 |
| | | Precursor thickness | μm | 68 | 68 | 68 | 68 | 68 |
| | Layer (Sa) (Layer (Sa) + Layer (Sb)) | Dried thickness | μm | 108 | 108 | 113 | 104 | 110 |
| | Layer (C) | AR | meq/g | 1.08 | 1.06 | 1.08 | 1.08 | 1.08 |
| | | Precursor thickness | μm | 12 | 12 | 12 | 12 | 12 |
| | | Dried thickness | μm | 15 | 15 | 14 | 13 | 14 |
| Conditions for hydrolysis treatment | Hydrolysis treatment (1st time) | Composition | DMSO/KOH/water (composition ratio: mass %) | 40/10/50 | 40/10/50 | 40/10/50 | 5/30/65 | 5/30/65 |
| | | Temperature | °C. | 95 | 95 | 95 | 55 | 95 |
| | | Time | min. | 10 | 10 | 10 | 120 | 8 |
| | | Treated side(s) | S'/C' | Only S' side | Only S' side | Both sides | Both sides | Both sides |
| | Hydrolysis treatment (2nd time) | Composition | DMSO/KOH/water (composition ratio: mass %) | 5/30/65 | 5/30/65 | — | — | — |
| | | Temperature | °C. | 95 | 95 | — | — | — |
| | | Time | min. | 8 | 8 | — | — | — |
| | | Treated side(s) | S/C | Only C' side | Only C' side | — | — | — |
| Ac resistance value | | S layer (A) | Ω·cm² | 6 | 9 | 5 | 14 | 12 |
| | | C layer (B) | Ω·cm² | 240 | 340 | 164 | 386 | 245 |
| | | A/B | — | 0.025 | 0.026 | 0.030 | 0.036 | 0.049 |
| Electrolysis performance | | Current efficiency | % | 96.7 | 97.5 | 96.3 | 97.7 | 96.7 |
| | | Electrolysis voltage | V | 3.06 | 3.08 | 3.05 | 3.16 | 3.13 |
| | | Electric power consumption rate | kWh/t-NaOH | 2,117 | 2,117 | 2,122 | 2,167 | 2,169 |

It has been shown that when an ion exchange membrane wherein the AC resistance value A of the layer (S) and the AC resistance value B of the layer (C) are within the scope of the present invention, is used, it is possible, at the time of the electrolysis of an alkali chloride, to make the electrolysis voltage to be low and the current efficiency to be high and thus to reduce the electric power consumption rate. On the other hand, it has been shown that if an ion exchange membrane wherein the AC resistance value A of the layer (S) and the AC resistance value B of the layer (C) are outside the scope of the present invention, is used, at least one of the electrolysis voltage and the current efficiency results to be poor, and the electric power consumption rate also becomes high.

This application is a continuation of PCT Application No. PCT/JP2017/015158, filed on Apr. 13, 2017, which is based upon and claims the benefit of priority from Japanese Patent Application No. 2016-080157 filed on Apr. 13, 2016. The contents of those applications are incorporated herein by reference in their entireties.

REFERENCE SYMBOLS

1: ion exchange membrane for alkali chloride electrolysis, 10: electrolyte membrane, 12: layer (C), 14: layer (S), 14A: layer (Sa), 14Aa: layer (Sa-1), 14Ab: layer (Sa-2), 14B: layer (Sb), 20: reinforcing material, 22: reinforcing thread, 24: sacrificial thread, 26: filament, 28: elution holes, 100: alkali chloride electrolysis apparatus, 110: electrolytic bath, 112: cathode, 114: anode, 116: cathode chamber, 118: anode chamber

What is claimed is:

1. An ion exchange membrane for alkali chloride electrolysis, having a layer (C) comprising a fluorinated polymer having carboxylic acid functional groups, and a layer (S) comprising a fluorinated polymer having sulfonic acid functional groups, wherein a reinforcing material comprising reinforcing threads is disposed in the layer (S), and when measured after the ion exchange membrane for alkali chloride electrolysis is immersed and held in a 32 mass % sodium hydroxide aqueous solution warmed at 90° C. for 16 hours and subsequently immersed in a 32 mass % sodium hydroxide aqueous solution at 25° C. for 3 hours, the AC resistance value A of said layer (S) and the AC resistance value B of said layer (C) satisfy the following formulae at the same time, $$1(\Omega \cdot cm^2) \leq A \leq 10(\Omega \cdot cm^2)$$

$$170(\Omega \cdot cm^2) \leq B \leq 550(\Omega \cdot cm^2).$$

2. The ion exchange membrane for alkali chloride electrolysis according to claim 1, wherein the ratio (A/B) of the AC resistance value A to the AC resistance value B satisfies the following formula, $$A/B \leq 0.03.$$

3. The ion exchange membrane for alkali chloride electrolysis according to claim 1, wherein the thickness when dried of the layer (C) is from 1 to 50 µm, and the thickness when dried of the layer (S) is from 30 to 200 µm.

4. The ion exchange membrane for alkali chloride electrolysis according to claim 1, wherein at least a part of the fluorinated polymer having sulfonic acid functional groups constituting the layer (S) is a polymer having structural units represented by the following formula (U1), wherein $Q^1$ is a perfluoroalkylene group which optionally have an etheric oxygen atom, $Q^2$ is a single bond or a perfluoroalkylene group which optionally have an etheric oxygen atom, $R^{f1}$ is a perfluoroalkyl group which optionally have an etheric oxygen atom, $X^1$ is an oxygen atom, a nitrogen atom or a carbon atom, when $X^1$ is an oxygen atom, a is 0, when $X^1$ is a nitrogen atom, a is 1, when $X^1$ is a carbon atom, a is 2, $Y^1$ is a fluorine atom or a monovalent perfluoro organic group, r is 0 or 1, and M is a hydrogen atom, an alkali metal or a quaternary ammonium base.

5. The ion exchange membrane for alkali chloride electrolysis according to claim 4, wherein the structural units represented by the formula (U1) are structural units based on a monomer represented by the formula (m1), wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

6. The ion exchange membrane for alkali chloride electrolysis according to claim 1, which further has an inorganic particle layer comprising inorganic particles and a binder, on at least one of the outermost surfaces.

7. A method for producing the ion exchange membrane for alkali chloride electrolysis as according to claim 1, comprising
a step of obtaining a reinforced precursor membrane having a precursor layer (C') comprising a fluorinated polymer having groups convertible to carboxylic acid functional groups, a precursor layer (S') comprising a fluorinated polymer having groups convertible to sulfonic acid functional groups, and a reinforcing material comprising reinforcing threads, disposed in the precursor layer (S'), and
a step of obtaining said ion exchange membrane for alkali chloride electrolysis by contacting the reinforced precursor membrane and an aqueous alkaline solution to convert the groups convertible to carboxylic acid functional groups in the precursor layer (C') to the carboxylic acid functional groups thereby to form said layer (C), and to convert the groups convertible to sulfonic acid functional groups in the precursor layer (S') to the sulfonic acid functional groups thereby to form said layer (S).

8. The method for producing the ion exchange membrane for alkali chloride electrolysis according to claim 7, wherein in the step of obtaining said ion exchange membrane for alkali chloride electrolysis,
as the aqueous alkaline solution, a first aqueous alkaline solution and a second aqueous alkaline solution different from the first aqueous alkaline solution in at least one of the composition and the temperature, are prepared, and
the precursor layer (C') is brought in contact with the first aqueous alkaline solution, and the precursor layer (S') is brought in contact with the second aqueous alkaline solution.

9. The method for producing the ion exchange membrane for alkali chloride electrolysis according to claim 8, wherein the first aqueous alkaline solution comprises an alkali metal hydroxide, a water-soluble organic solvent and water, and in the above first aqueous alkaline solution (100 mass %), the concentration of the alkali metal hydroxide is from 1 to 60 mass %, and the concentration of the water-soluble organic solvent is from 1 to 60 mass %; and the second aqueous alkaline solution comprises an alkali metal hydroxide, a water-soluble organic solvent and water, and in the above second aqueous alkaline solution (100 mass %), the concentration of the alkali metal hydroxide is from 1 to 60 mass %, and the concentration of the water-soluble organic solvent is from 1 to 60 mass %.

10. The method for producing the ion exchange membrane for alkali chloride electrolysis according to claim 8, wherein the temperature of the first aqueous alkaline solution is from 30 to 95° C., and the temperature of the second aqueous alkaline solution is from 30 to 95° C.

11. The method for producing the ion exchange membrane for alkali chloride electrolysis according to claim 9, wherein the alkali metal hydroxide is sodium hydroxide or potassium hydroxide.

12. The method for producing the ion exchange membrane for alkali chloride electrolysis according to claim 9, wherein the water-soluble organic solvent contains at least one member selected from the group consisting of aprotic organic solvents, alcohols and amino alcohols.

* * * * *